(12) United States Patent
Chi et al.

(10) Patent No.: US 8,316,010 B2
(45) Date of Patent: Nov. 20, 2012

(54) SYSTEMS AND METHODS FOR SLA-AWARE SCHEDULING IN CLOUD COMPUTING

(75) Inventors: Yun Chi, San Jose, CA (US); Hyun Jin Moon, Newark, CA (US); Junichi Tatemura, Cupertino, CA (US); Vahit Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 337 days.

(21) Appl. No.: 12/818,155

(22) Filed: Jun. 18, 2010

(65) Prior Publication Data

US 2011/0219031 A1 Sep. 8, 2011

Related U.S. Application Data

(60) Provisional application No. 61/311,617, filed on Mar. 8, 2010.

(51) Int. Cl.
*G06F 17/30* (2006.01)
*G06F 7/00* (2006.01)
(52) U.S. Cl. ......... 707/713; 707/719; 709/226; 718/102
(58) Field of Classification Search .......... None
See application file for complete search history.

(56) References Cited

U.S. PATENT DOCUMENTS

| | | | |
|---|---|---|---|
| 2005/0071182 A1* | 3/2005 | Aikens et al. | 705/1 |
| 2010/0094828 A1* | 4/2010 | Mehta et al. | 707/705 |
| 2010/0153960 A1* | 6/2010 | Youn et al. | 718/104 |

OTHER PUBLICATIONS

Jon M. Peha, et al., Cost-Based Scheduling and Dropping Algorithms to Support Integrated Services, IEEE Transactions on Comm, vol. 44, No. 2, Feb. 1996.
Chetan Gupta, et al., Fair, Effective, Efficient and Differentiated Scheduling in an Enterprise Data Warehouse (2009), Proceedings of the 12th International Conference on Extending Database Technology; Advances in Database Technology, Mar. 2009.
Florentina I. Popovici, et al., Profitable Services in an Uncertain World, Supercomputing, 2005, Proceedings of the ACM/IEEE SC 2005, Conference, Nov. 2005.
Jayant R. Haritsa, et al., Value-Based Scheduling in Real-Time Database Systems, The VLDB Journal—The International Journal on Very Large Data Bases, vol. 2, Issue 2, 117-152, Apr. 1993.

* cited by examiner

*Primary Examiner* — Charles Kim
*Assistant Examiner* — Miranda Huang
(74) *Attorney, Agent, or Firm* — Joseph Kolodka (57) ABSTRACT

Systems and methods are disclosed for scheduling one or more queries for execution with one or more cloud computers by applying a service level agreement (SLA) analysis using an SLA-tree data structure to each query in a query queue; using the SLA-tree data structure to determine an overall profit in the query queue; and generating a profit-oriented schedule to select the next query for execution by the cloud computers.

21 Claims, 8 Drawing Sheets

SYSTEMS AND METHODS FOR SLA-AWARE SCHEDULING IN CLOUD COMPUTING

The present application claims priority to U.S. Provisional Application Ser. No. 61/311,617 filed Mar. 8, 2010, the content of which is incorporated by reference.

BACKGROUND

The present application relates to a service level agreement aware scheduling of tasks in cloud computing.

Cloud computing has become highly popular due to its cost-effectiveness and ability to provide scalable computing. As cloud computing becoming increasingly more important in database systems, many new technical challenges have arisen. Cloud computing systems are usually profit-oriented and therefore call for treatments different from standard approaches in traditional database systems and computer networks. For the service provider of a cloud computing system, a common business model is to negotiate certain contracts with customers, where the contracts are often in the form of service level agreements (SLAs). Given the SLAs, it is up to the service provider to set up the cloud computing system and to provide the agreed-upon services accordingly. Some key technical components for a cloud computing system include capacity planning (e.g. hardware and software setting), dispatching (e.g., routing queries to different data centers), scheduling (e.g., setting priorities to the queries from customers with different service levels), online system tuning and monitoring (e.g., burstiness and fraud detection), for example.

In traditional systems, commonly used performance metrics such as system response time delay and throughput are not directly profit-aware. In cloud computing in comparison, queries usually come from different customers and these customers have different profit profiles. It is to the service provider's interests to directly optimize the profit instead of, say, to reduce the average response time among all customers.

Figure 1:
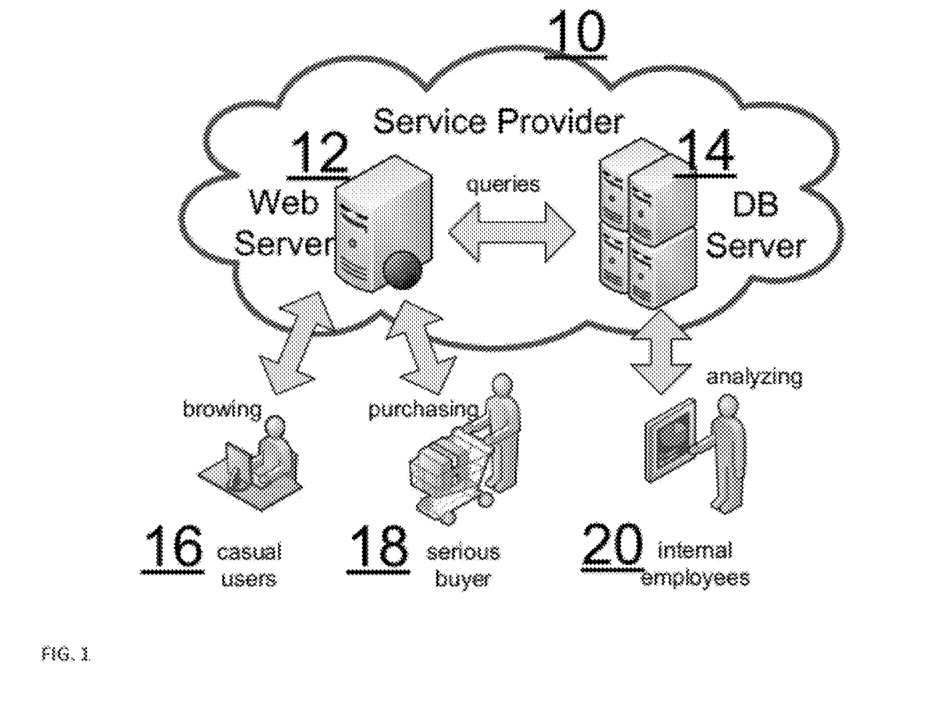
FIG. 1 shows an exemplary cloud computing system.

FIG. 1 shows an exemplary cloud computing system. In this system, a cloud service provider 10 is hosting an online shopping site with server 12 and a database server 14. Queries come from different users: when a query comes from a serious buyer 18 (e.g., a user who has been ready to check out his or her shopping cart), the potential profit of answering the query can be high and the delay should be short; on the other hand, when the query is from a casual user 16 (e.g., someone just uses the shopping site's tools to compare features of different products), the potential profit may be low and longer delay is tolerable; yet another query may come from an internal employee 20 of the shopping site who is collecting some data to make certain real-time decisions (e.g., whether to put certain products on sale), and in such a case a much longer delay is acceptable up to certain threshold (after which a penalty may incur due to the failure to make decision). Another observation from this example is that the workload in a cloud database system is usually a mixture of short queries (e.g., OLTP queries from buyers) and long queries (e.g., OLAP queries from internal employees). As can be seen from this example, because of such variety in customer profit profiles, a service provider should consider the perspectives of individual customers and make profit-oriented decisions in the design of the cloud computing system.

Cloud providers operate under Service Level Agreements (SLAs), which are agreements between a service provider and its customers. SLAs are used to indicate the profits the service provider may obtain if the service is delivered at certain levels and the penalty the service provider has to pay if the agreed-upon performance is not met. There exist many forms of SLAs with different metrics (delay, throughput, etc.) and measurement methods (e.g., measured by per-customer or per-query).

Many system design issues, such as scheduling and dispatching have been extensively studied in various areas such as computer networks, operating systems, and database systems. Traditional system designs, however, have two weak points when directly applied to cloud computing systems. First, instead of distinguishing the profit of each query, traditional systems mainly use system level metrics, such as overall throughput or average response time among all queries, to measure system performance. Second, in traditional computer networking systems, scheduling and dispatching policies are usually simple and only based on local information. Such design principles make sense in a distributed setting where the schedulers are located in individual routers and have to make quick decisions based on locally available information. In comparison, in cloud computing systems, service providers usually have more control on the environment and more sophisticated policies are justified as long as operational profits can be reasonably improved. Most existing scheduling policies either are not profit aware or estimate the profit of each query independent of other queries. In addition, existing techniques in system profiling, query dispatching, and capacity planning usually do not directly use information from scheduling.

SUMMARY

In one aspect, systems and methods are disclosed for scheduling one or more queries for execution with one or more cloud computers by applying a service level agreement (SLA) analysis using an SLA-tree data structure to each query in a query queue; using the SLA-tree data structure to determine an overall profit in the query queue; and generating a profit-oriented schedule to select the next query for execution by the cloud computers.

In another aspect, a cloud computing system includes a data storage device including a service level agreement (SLA)-tree data structure to store each query, slack, tardiness, position in the original baseline schedule, and associated SLA in a query queue; and a processor coupled to the data storage device, the processor applying the SLA-tree data structure to determine an overall profit in the query queue and generating a profit-oriented schedule to select the next query for execution by the cloud computers.

In a further aspect, systems and methods are disclosed for scheduling one or more queries for execution with one or more cloud computers by generating an SLA-tree data structure by: receiving as input slack, tardiness, position in the original baseline schedule, and associated SLA for each query in the queue; decomposing each multi-level SLA into a sum of single-step SLAs if the SLAs are multi-level; from the queries, constructing one or more leaf nodes of a slack tree and a tardiness tree; performing an upward pair-wise merge of each pair of lower level nodes into a parent node; and repeating the pair-wise merge until a single root node is reached for the slack tree and a root node is reached for the tardiness tree. The system then uses the SLA-tree data structure to determine an overall profit in the query queue; and generates a profit-oriented schedule to select the next query for execution by the cloud computers.

Advantages of the preferred embodiments may include one or more of the following. The SLA-tree data structure supports profit-oriented decisions in cloud computing. SLA-tree combines the outcome from a baseline scheduler with the SLA of each query and is able to efficiently infer the potential profit change if certain queries are postponed or expedited. The SLA-tree can answer various "what if" questions. And by using such answers, the system can improve the profit for the service provider of a cloud computing system by improving tasks such as scheduling, dispatching, and capacity planning. The can improve the profit margins for a service provider of a cloud computing system. In addition, SLA-tree scheduling achieves the profit improvement by using a very fast operation. The system provides a scheduling policy and a data structure in a cloud computing system that is both profit optimizing and efficient. The information generated by the scheduling policy can be used to optimize other profit-oriented tasks in cloud computing such as system profiling, query dispatching, and capacity planning. The system improves the existing baseline schedules, which can be either profit-unaware or profit-aware, in terms of better overall profits. It also provides valuable information that makes other tasks, including system monitoring, dispatching, and capacity planning, more profit-oriented.

BRIEF DESCRIPTION OF THE DRAWINGS

FIG. 8A shows an SLA with multiple levels of profit, while FIG. 8B shows a profit decomposition.

DESCRIPTION

Figure 2:
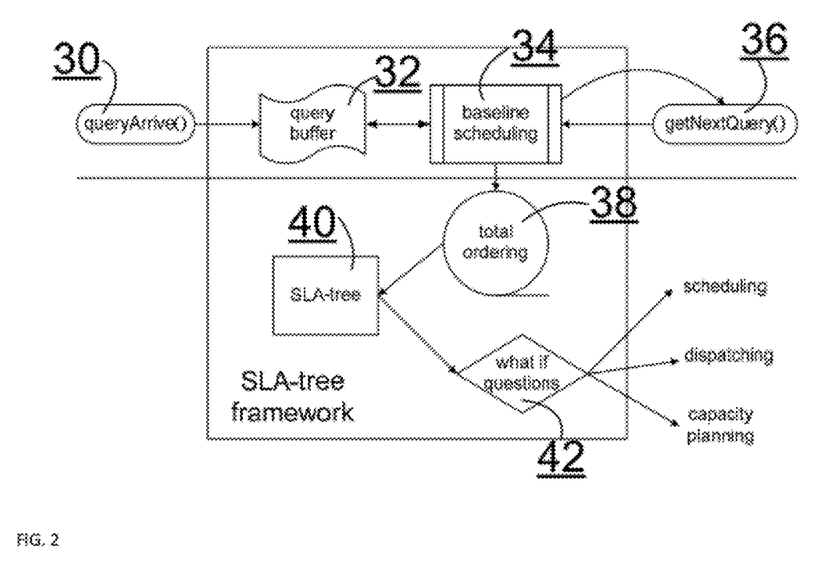
FIG. 2 shows an exemplary framework that supports SLA-based, profit-oriented decisions in a cloud computing system.

FIG. 2 shows an exemplary framework used by the preferred embodiment (SLA-tree) that supports SLA-based, profit-oriented decisions in a cloud computing system. A query 30 arrives and is presented to a query buffer 32 for a baseline cheduler 34. The baseline scheduler 34 communicates with the a module 36 that gets the next query. The scheduler 34 also communicates total ordering information 38 to the SLA-tree 40. The SLA tree 40 is used with the baseline scheduler 34 as a special function that assigns a total ordering among all queries in the query queue. Such a total ordering 38 is then combined with SLAs to build the SLA-tree data structure. From SLA-tree, the system can efficiently infer the potential profit impact if certain conditions are changed in the system. Equipped with such capability, a series of "what if" questions 42 can be presented to the SLA-tree in real time to make profit-oriented decisions in scheduling, dispatching, capacity planning, among others.

Figure 3:
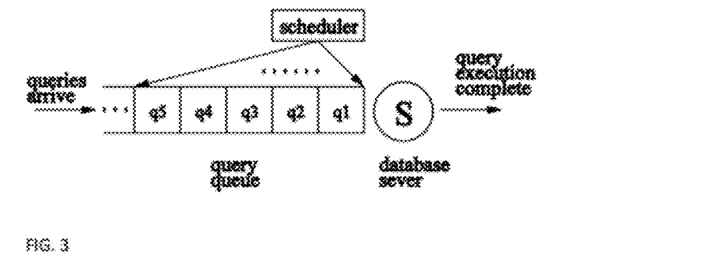
FIG. 3 shows an exemplary single queue/single server.

An exemplary scenario with a single queue and a single server is illustrated in FIG. 3. A query arrives at the system and joins the queue of queries to be executed in the database server. When the execution of the current query in the database server is completed, a scheduler chooses a query in the queue, according to certain scheduling policy, to be sent to the database server to execute next.

This example is mainly interested for a single queue for each server and so does not consider the case where there are multiple queues (e.g., one for gold members and one for silver members) in front of the database server. In addition, in each database server, only one instance is running (i.e., the multi-programming level is always set to 1). Furthermore, the system provides online scheduling where query properties are not known beforehand with non-preemptive policies, which is commonly used in databases, i.e., once a query has started its execution in the system, it cannot be stopped in the middle and be resumed or restarted later.

Figure 4:
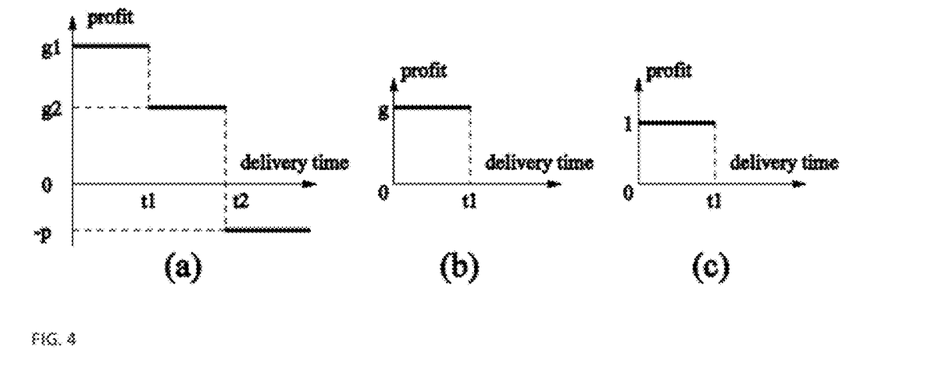
FIGS. 4A, 4B and 4C show exemplary profit models.

FIGS. 4A, 4B and 4C shows exemplary SLAs with (a) general profit-penalty model, (b) g/0 profit model, and (c) 1/0 profit model, assuming the query arrives at time 0. In one embodiment, the metric of the SLAs used is the system response time, that is, the time between a query is presented to the system and the time when the query execution is completed. For the SLA shape, the system uses the stepwise function. Assuming a query is presented to the system at time 0, if the system is able to finish the execution of the query at time t and t is earlier that $t_1$, then the service provider obtains a gain of $g_1$; otherwise, if $t_1 < t \leq t_2$, the gain is $g_2$, and so on. Finally, if the answer cannot be delivered within certain delay ($t_2$ in the example), a penalty p in incurred. This is shown in FIG. 4A. The embodiment chooses query-level SLAs instead of customer-level SLAs. The reason for this choice is that often based on the expected traffic pattern provided by a customer, in an SLA, the service provider can assign different prices for queries within the expectation (e.g., the first 1000 queries during a day) and those beyond budget (e.g., over-use charge). Therefore, for the queries from the same customer, the price may change because of the previous usage by the customer. From the service provider's point of view, its profit is the difference between the revenue (e.g., gains obtained according to SLAs) and the cost (e.g., operational cost). In the embodiment, profit (e.g., profit-orientation and profit maximization), refers to revenue because the cost is relatively fixed when comparing the profit of different policies.

Next, an SLA-Tree for 1/0 Profit Model is discussed. In one embodiment with N queries $q_1 \ldots q_N$ to be scheduled. Furthermore, assume a schedule can be generated by a baseline scheduling policy (either profit-unaware or profit-aware). With the profit model clarified and with a baseline schedule proposed, a data structure called an SLA-tree efficiently selects the next query to be executed. The main purpose of an SLA-tree is to efficiently answer the following two questions (assuming $1 \leq m \leq n \leq N$):

How much profit will be lost if the system postpones queries at the positions between m and n in the queue by a time interval of $\tau$?

How much profit will be gained if the system expedites the queries at the positions between m and n in the queue by a time interval of $\tau$?

In one embodiment, the query ordering in the baseline schedule is $q_1 < q_2 < \ldots < q_N$, i.e., the query with id 1 is scheduled to be executed first and the query with id N last.

Figure 5:
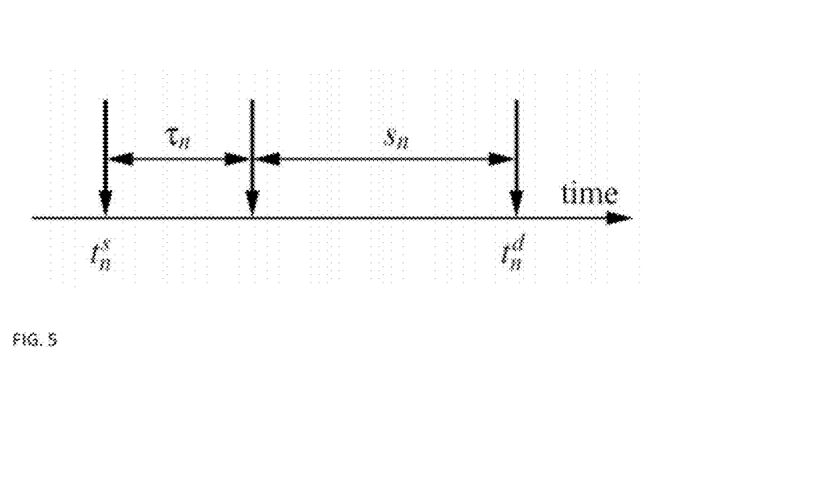
FIG. 5 illustrates a derivation of slack.

In a simple 1/0 profit SLA, as shown in FIG. 4C, a profit of 1 is gained if the delay is less than $t_1$ and 0 otherwise (i.e., there is no penalty). The delay time is converted into a slack time. In the 1/0 profit SLA model, for each query $q_n$ in the queue, there are three parameters: $t_n^d$, $t_n^2$, and $t_n^d$ to is the deadline for query $q_n$. That is, if query $q_n$ is finished before $t_n^d$, the profit to the service provider is 1, otherwise the profit is 0. Thus, $t_n^d$ depends on the arrival time and the SLA threshold for query $q_n$. $t_n^s$ is the scheduled starting time for query $q_n$. $\tau_n$ is the expected execution time for $q_n$ in the server. For convenience, instead of $t_n^d$ and $t_n^s$, the expected slack $s_n$, where $s_n = t_n^d - t_n^2 - \tau_n$, is used as illustrated in FIG. 5. Slack $s_n$ is the time $q_n$ can be further postponed (with respect to the original scheduled starting time) without introducing additional penalties. If the slack is a negative value, we reverse its sign and call it tardiness, which is again a positive value. In other words, if $s_n < 0$, then the tardiness $-s_n$ indicates the time query $q_n$ has to be moved forward (with respect to its originally scheduled time) in order for its profit to be increased from 0 to 1.

The SLA-tree handles the two questions of postpone(m,n,$\tau$) and expedite(m,n,$\tau$). The SLA-tree data structure consists of a pair of components—a slack tree $S^+$ and a tardiness tree $S^-$. The slack tree $S^+$ is a balanced binary search tree built in the following way. First, from the baseline schedule the system computes slacks $s_1, \ldots, s_N$ for all the queries $q_1, \ldots, q_N$ and sort them in the increasing order. Then the queries whose slack values are non-negative are used to construct the binary search tree $S^+$, which is constructed by merging the sorted list in a bottom-up fashion. More specifically, the sorted list of queries (sorted by slacks) are the leaf nodes of $S^+$ and upward pairwise merges are recursively used to build the internal nodes of $S^+$. Each node d of $S^+$ has two parts: a slack value $d_\tau$ and an ordered list of descendants $d_l$. Here is a recursive description:

Each leaf node in $S^+$ corresponds to a query: its slack value is the query's slack and its descendant list contains a single item: the id of the corresponding query;

For an internal node, its slack value is the middle point between the largest slack value in its left subtree and the smallest slack value in its right subtree; and its descendant list contains the query id's of all its descendant nodes, sorted by query id.

Figure 6:
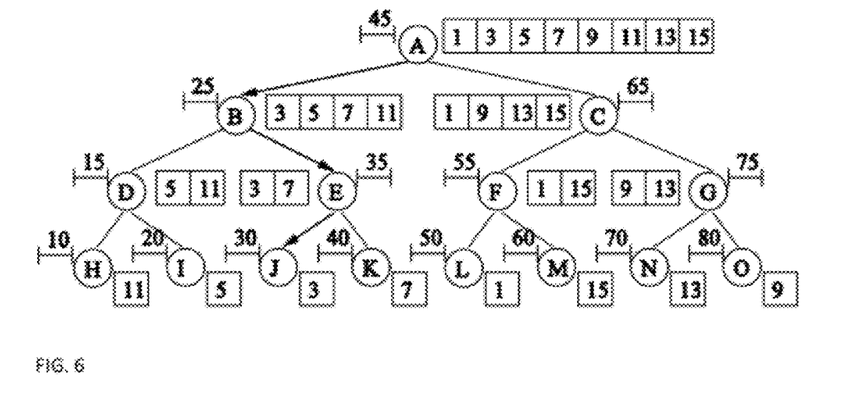
FIG. 6 shows an exemplary slack tree in the SLA tree.

FIG. 6 shows an exemplary slack tree in the SLA-tree, with 1/0 profit model. In this example, there are 16 queries with ids from 1 to 16. The query execution order in the baseline schedule is query 1, and then query 2, . . . , and finally query 16. In addition, for illustration purposes, queries with odd ids have positive slack values and queries with even ids have negative slack values (tardiness). As a consequence, the slack tree in FIG. 6 is constructed by queries 1,3,5, . . . ,15. In the figure, for each node d in the slack tree, its slack value $d_\tau$ is given by a number on top of a line segment and its descendant list is shown as an array in square boxes. For example, look at node D: it is an internal node with a slack value of 15 and a list of two descendants with ids 5 and 11, respectively.

The querying the Slack Tree $S^+$ is discussed next where postpone(m,n,$\tau$) can be done by using $S^+$. With a case where m=1, i.e., postpone(1,n,$\tau$), to answer postpone(1,n,$\tau$), the system traverses $S^+$ starting from visiting the root in the following way. An accumulator c is used and its initial value is set to zero. For an internal node d, $\tau$ is compared with $d_\tau$. There can be two cases:

If $\tau$ is less than or equal $d_\tau$, then none of (the queries corresponding to) the descendants of d's right child has slack less than $\tau$ and so they can be ignored. If this happens, the system visits the left child of d and ignore the right child of d.

If $\tau$ is greater than $d_\tau$, then all of (the queries corresponding to) the descendants of d's left child have slacks less than $\tau$, and the only unknown is how many of them have id's less than or equal to n. This can be answered by a binary search for n in the descendant list of the left child of d. Assuming this number of queries is k, then the system increases c by k and visits the right child of d.

The traversal will finally arrives at a leaf node d. When this happens, the system increments c by 1 if the query id in the leaf node d is less than or equal to n and $\tau > d_\tau$. Finally, the result c represents the number of queries that (1) have id's less than or equal to n and (2) have slacks less than $\tau$. This number c is exactly the profit loss that will be introduced in queries 1 through n are postponed by a time interval of $\tau$.

The Building and Querying the Tardiness Tree $S^-$ is discussed next. The tardiness tree $S^-$ is very similar to the slack tree $S^+$. The only difference is that $S^-$ is built for those queries whose slacks are negative. That is, the system builds $S^-$ by using the tardiness for those queries with negative slacks. Then expedite(m,n,$\tau$) is done by traversing $S^-$ in a similar way previously traversed $S^+$.

The SLA-tree can handle the general profit model, as illustrated in FIG. 4A. For ease of discussion, an intermediate model, the g/0 profit model, as illustrated in FIG. 4B is discussed first. The SLA-tree is extended from the 1/0 profit model to the g/0 profit model. As discussed above when moving to a right child, the system asks its left sibling "in your descendant query list, how many of them have id less than or equal to n". The system is concerned about is not "how many" but "how much profit loss". These two happen to be identical in the case of 1/0 profit. Thus, for $g_n$/0 profit, where $g_n$ is the profit loss because of missing query n's deadline, the system looks for "among the queries with id's less than or equal to n in the descendant query list, what is the total profit loss". Therefore, if we have this total profit loss for each entry in each descendant list, then we can handle arbitrary profit loss. This can be achieved by accumulating and recording these losses while merging the descendant lists. It can be shown obtaining such losses can be done in an incremental way and so will not change the time complexity of building the SLA-tree.

Figure 7:
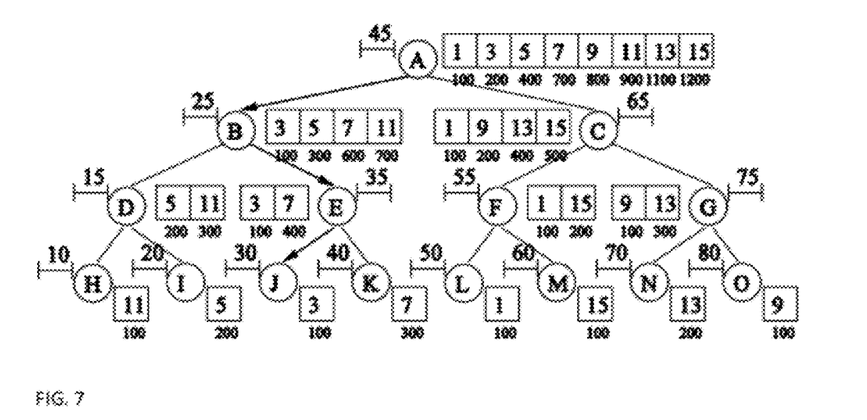
FIG. 7 shows an exemplary slack tree in the SLA tree with a g/0 profit model.

FIG. 7 shows a simple version of a slack tree in the SLA-tree, with g/0 profit model. Such an SLA-tree shows the total profit losses given at the bottom of each item in each descendant list. For example, for node D, we can see that the total profit loss for queries with ids of 5 or lower is 200, and that for queries with ids of 11 or lower is 300.

Figure 8:
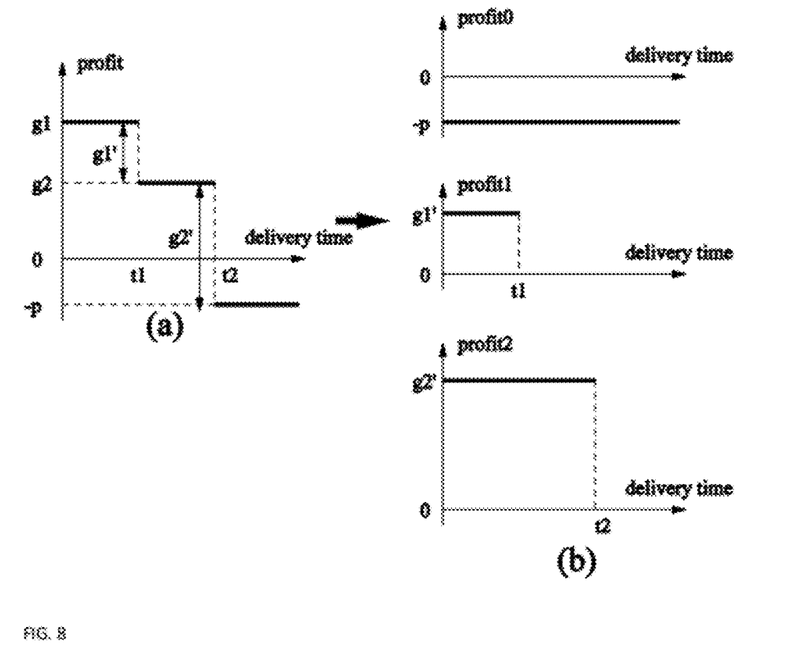

The SLA-tree can be extended to handle the general profit model as described in FIG. 8A. The idea here is to decompose a general profit model SLA into the sum of several g/0 profit model SLAs. This is illustrated in FIG. 8. FIG. 8A shows the general profit model: if the query execution is completed before $t_1$, a profit gain $g_1$ is obtained; otherwise if it is completed before $t_2$, a smaller profit gain $g_2$ is obtained; otherwise, a penalty p is incurred. In an equivalent profit model, for each query, the service provider starts by paying the penalty p upfront; then if the query execution is completed before $t_2$, a profit gain $g_2' = g_2 + p$ is made; if in addition, the query is completed before $t_1$, an additional profit gain $g_1' = g_1 - g_2$ is made. With such a decomposition of SLAs, the SLA-tree can handle SLAs with the general profit model.

This is done by decomposing the general SLA into the sum of several g/0 profit model, as shown in FIG. 8B. Assuming each SLA-tree has exactly K steps, the system can duplicate each query id by K times (obviously with different slack values). Then the system can build and query SLA-tree the same way as before. There are two changes here: when merging two descendant query lists, if two copies of the same query meet, then their accumulative profits are added and they are combined as a single query in the current descendant list.

Figure 9:
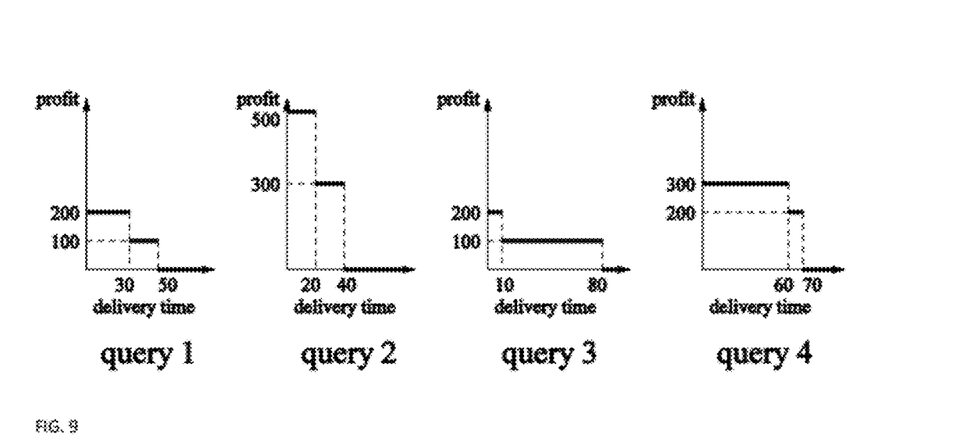
FIG. 9 shows exemplary profits for four exemplary queries.
Figure 10:
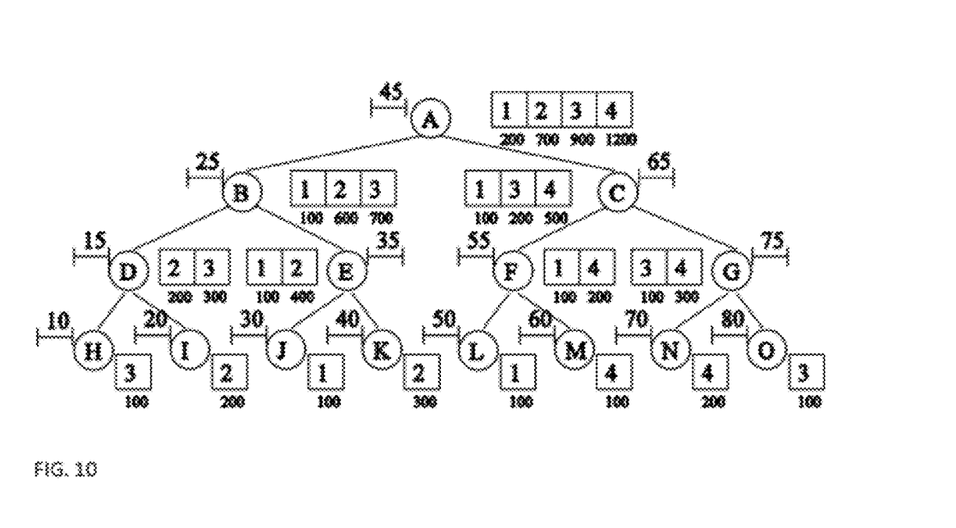
FIG. 10 shows a exemplary slack tree in the SLA tree with general profit model.

FIG. 9 shows exemplary 4 queries with different general SLAs and FIG. 10 shows the corresponding slack tree in the SLA-tree, with general profit model.

Nex,t the use of the SLA-Tree for Profit-Oriented Scheduling and Dispatching is discussed. The SLA-tree can be used efficiently answer two key questions, postpone(m,n,$\tau$), the profit loss if queries $q_m$ to $q_n$ are postponed by τ from their original schedule, and expedite(m,n,τ), the profit gain if query $q_m$ and $q_n$ are expedited by τ from their original schedule.

The baseline scheduling policy can be SLA-unaware, such as first-come-first-serve (FCFS) and shortest-job-first (SJF), which totally depend on the characteristics of queries and not on the SLAs associated with the queries. Based on SLA-tree, a method can be used to improve the baseline scheduling policy by directly looking at the profit change. For each query $q_n$ in the query queue, the system determines "what will the profit gain be if $q_n$ is rushed instead of $q_1$ to be executed next, with all other conditions unchanged." Then instead of picking $q_1$, which was selected by the baseline policy, the immediate execution of $q_n$ brings in the maximum profit gain can be done. Such a simple SLA-tree based method is expected to make SLA-unware policies to become more SLA-aware, and improve already SLA-aware policies by taking all the queries in the queue into consideration. By rushing $q_n$, there will be a potential profit gain because $q_n$ is executed ealier than it was originally scheduled (e.g., originally $q_n$ was not supposed to be completed on time but becomes so if it is rushed to be executed first). Additionally, there will be a potential profit loss because queries $q_1$ through $q_{n-1}$ will be postponed by $\tau_n$, the execution time of $q_n$. The profit gain of rush $q_n$ is $$p_n = p_{gain}(q_n) - p_{loss}(q_1, \ldots, q_{n-1}).$$

The first part can be easily obtained and the second part is exactly postpone(1,n−1,$\tau_n$).

Capacity planning is crucial for the success of a cloud service provider and covers many issues, ranging from the decisions of hardware and software settings to the choice of data storage format. Capacity planning covers many issues (e.g., number of servers to use, number of software license to purchase, which storage to choose for each data, among others). If a service provider hosts several customers who have different SLA profiles. For the purpose of cost efficiency, the services for these customers are shared, either through multitennancy, where tables of different customers are stored in a shared database, or through virtual machine, where customers share the same resources such as CPU and memory. The SLA-tree can be used to provide such an accurate estimation of the potential profit gain by increasing the QoS of each data item. During SLA-tree scheduling, the system computes $$p_n = p_{gain}(q_n) - \text{postpone}(1, n, \tau_n)$$

for each query in the queue in order to obtain the query whose immediate execution improves the profit the most. However, at the same time the system also compute s $$p_{n'} = p'_{gain}(q_n) - \text{postpone}(1, n, \tau_{n'})$$

which is the profit gain to executing $q_n$ right now under the assumption that the higher QoS for $q_n$ were available. Because $\tau_{n'} < \tau_n$, both terms in $p_{n'}$ may be different from their values in $p_n$. The SLA-tree will pick the query having the largest p value, indicated by $p_n$. At the same time, the largest p' value is selected as $p_{m'}$, where m can be the same as n. If $q_m$ is about data item d, then the profit difference $p_{m'} - p_n$ is the profit gain if right now, with all other condition unchanged, the system increases the QoS for data d. Such a value is reported each time SLA-tree is called for scheduling the next query. Over time, the system can obtain a profile of the potential profit gain of improving the QoS for each data item.

For Online Resource Allocation, the profit margin of adding an additional database server is very valuable for a service provider to estimate the benefits of adding servers in capacity planning. In one embodiment, all database servers are capability-homogeneous, in the sense that they all are capable of answering any query and different servers can have different CPU speeds. With m database servers, in total making a profit of $ a per day. The SLA-tree can help capacity planning. At a given moment, the system asks each server $S_i$ "how much more profit can be made if an additional server can immediately execute another query in $S_i$'s query query". Assuming the answer in $g_n$ by serving query $q_n$ which has an execution time $\tau_n$, then $g_n/\tau_n$ is the profit derivative for server $S_i$. The average among all servers will provide an estimation of the profit derivative for the whole system. The SLA-tree can be directly used for this purpose.

As described above, the SLA-aware scheduling policy can be applied in profit-oriented cloud database systems. The new scheduling policy is based on the SLA-tree data structure that efficiently encodes profit changes due to certain query order changes. Experimental results showed that SLA-tree can improve profit over existing profit-unaware and profit-aware scheduling policies. Furthermore, both theoretical analysis and experimental studies demonstrated that SLA-tree can potentially provides valuable and accurate information that can be used by cloud database service providers for other profit-oriented tasks such as database profiling, dispatching, and capacity planning.

Figure 11:
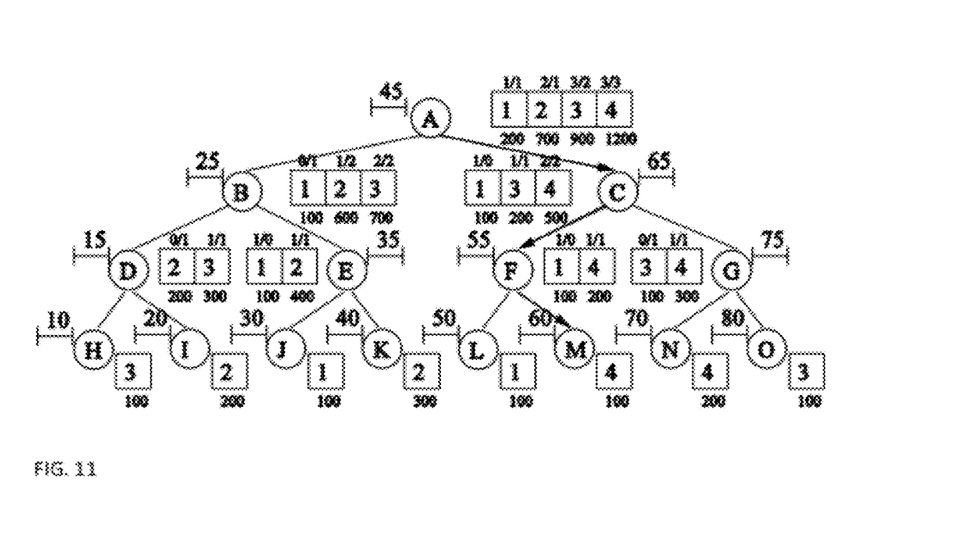
FIG. 11 illustrates information stored in the SLA tree.
Figure 12:
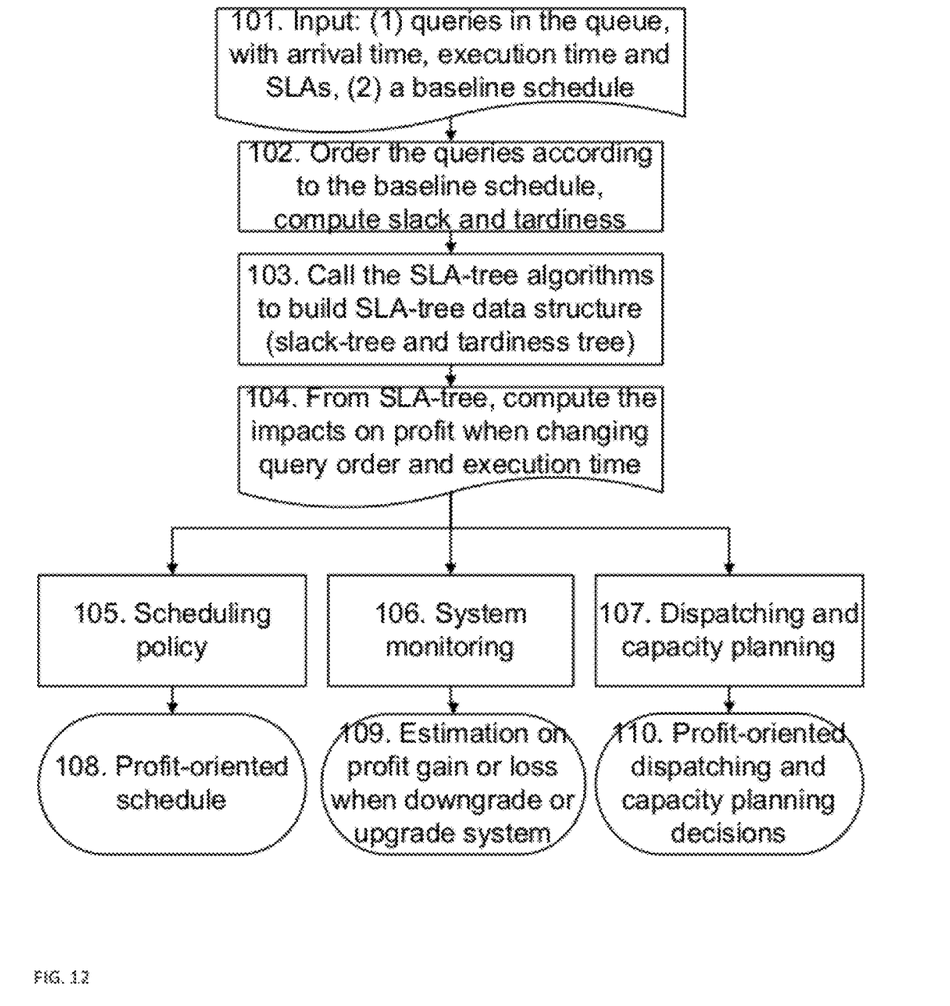
FIG. 12 shows an exemplary process to make SLA-based, profit oriented decisions in the cloud computing system.

FIG. 11 illustrates the information stored in SLA-tree, in this case a slack tree. First, the SLA-tree is a complete binary search tree. That is, a node either is a leaf (and so corresponds to a query) or has exactly two children. Therefore, the tree size is 2M−1 where M is the total number of leaf nodes, i.e., the number of queries (and their duplications generated by the decomposition of SLAs) that have positive slacks. So M is bounded by NK, where N is the total number of queries in the query queue (where a query can be in the slack-tree, or the tardiness-tree, or both) and K is the number of "steps" in the stepwise SLA. In FIG. 12, nodes A through G are internal nodes, and nodes H through O are leaf nodes.

Second, for each SLA-tree node d, its slack value $d_\tau$ is the average between the maximum slack in its left subtree and the minimun slack value in its right subtree. This slack value is the search key for the binary search tree. In addition, node d has a descendent list to record the ids of all the queries who are decendents of d, and the ids in the list are in an increasing order. Such an order can be automatically obtained during the SLA-tree construction, as will be discussed shortly. For each query id i in d's descendent list, there is a number (indicated by the numbers below the boxes in FIG. 12) records the information about "among all queries with ids≦i among the descendents of t, the total profit loss if they are all postponed by $d_\tau$". As will be seen shortly, such total profits can be easily obtained during the SLA-tree construction.

Third, the last piece of information in SLA-tree is the left/right pointers for each item in a descendent list. For an internal node d, for each query id i in d's descendent list, i's left pointer records the index, in the descendent list of d's left child, of the largest query id that is ≦i. i's right pointer is defined similarly but based on d's right child. A moment of thoughts will reveal that such a pointer records exactly the location that will be resulted by the binary search in the naive version of SLA-tree (as described in Section 4). Therefore such pointers, because their construction cost does not increase the overall time complexity, are the key to reduce the SLA-tree scheduling complexity.

FIG. 12 shows an exemplary process to use the SLA tree in cloud computing scheduling, monitoring, dispatching and capacity planning. In 101, the method receives as input 1) queries in the queue, together with their arrival time, execution time, and associated SLAs; and 2) a baseline schedule, which can be either profit-unaware or profit-aware. Next, in 102, the method orders the queries according to the baseline schedule to compute the slack and tardiness based on the baseline schedule. Next, in 103, the method calls the SLA-tree procedure to build the main data structure, an SLA-tree. This procedure is detailed in FIG. 13.

In 104, based on SLA-tree, the method efficiently determines the potential profit change if for each query, instead of its original execution order and execution time, the query is moved to the first position of the queue, and if the execution time varies. In 105, the method schedules the next query to execute based on the information obtained in 104. Next, in 106, the method monitors the status of the system using the information obtained in 104. In 107, the method determines a dispatching decision and planning capacity based on the information obtained in 104. In 108, the method applies a profit-oriented schedule for queries, obtained from 105. In 109, the method performs estimation on the potential profit gain or profit loss when the system resource and data storage are upgraded or downgraded, obtained from 106. Next, in 110, the method determines the profit-oriented dispatching and capacity planning decisions, obtained from 107.

Figure 13:
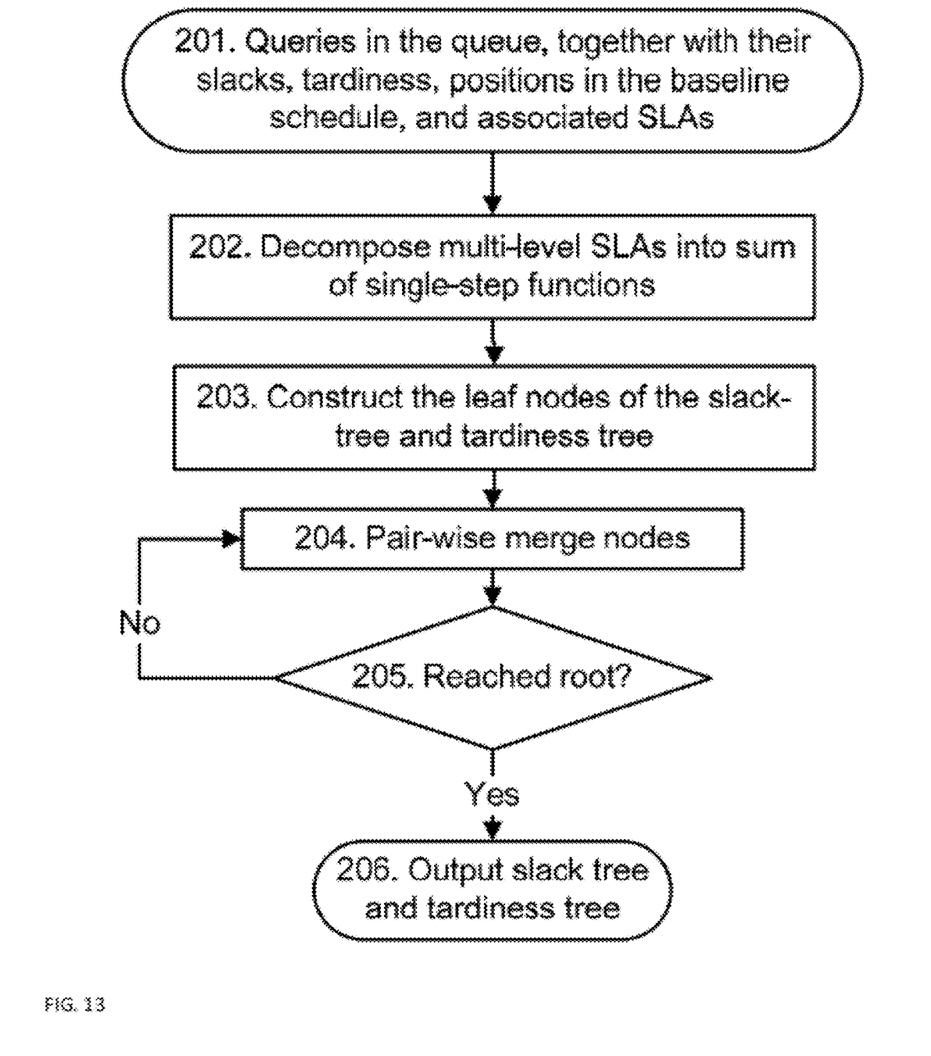
FIG. 13 shows an exemplary process to form the SLA tree.

FIG. 13 shows an exemplary process to form the SLA tree. In 201, the procedure receives as input the queries in the queue, together with the slack, tardiness, position in the original baseline schedule, and associated SLA for each query in the queue. In 202, if the SLAs are multi-level, the procedure decomposes each multi-level SLA into the sum of several single-step SLAs. In 203, the procedure uses the queries (or the replicas of the queries, if the SLAs are multi-level) to construct the leaf nodes of slack tree and tardiness tree. In 204, the procedure runs an upward pair-wise merge of each pair of lower level nodes into a parent node. In 205, the procedure repeats until a single root node is reached for the slack tree and a root node is reached for the tardiness tree. The procedure ends in 206 and returns the slack tree and tardiness tree as outputs.

The foregoing system uses the SLA-tree efficiently supports SLA-based, profit-oriented decisions in cloud computing. SLA-tree is built on top of a baseline schedule for current queries and corresponding SLAs between the service provider and service customers. SLA-tree is able to quickly answer various profit-oriented "what if" questions based both on SLAs and system conditions. Answers to these "what if" questions can be applied to different profit-oriented tasks in cloud computing such as profit-aware scheduling, profit-aware dispatching, capacity planning, among others. Extensive experimental results based on both synthetic and real data demonstrated the effectiveness and efficiency of the SLA-tree framework.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer with digital signal processing capability to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for scheduling one or more queries for execution with one or more cloud computers, comprising:
generating the SLA-tree data structure by:
a. for each query in a queue, receiving as input slack, tardiness, position in the original baseline schedule, and associated SLA;
b. if the SLAs are multi-level, decomposing each multi-level SLA into a sum of single-step SLAs;
c. from the queries, constructing one or more leaf nodes of a slack tree and a tardiness tree;
d. performing an upward pair-wise merge of each pair of lower level nodes into a parent node; and
e. repeating the pair-wise merge until a single root node is reached for the slack tree and a root node is reached for the tardiness tree;
applying a service level agreement (SLA) analysis using an SLA-tree data structure to each query in a query queue;
using the SLA-tree data structure to determine an overall profit in the query queue; and
generating a profit-oriented schedule to select the next query for execution by the cloud computers.

2. The method of claim 1, comprising applying the profit-oriented schedule to a profit-oriented task selected from the group consisting of profiling the cloud computing system, profit-oriented dispatching, and profit-oriented capacity planning.

3. The method of claim 1, comprising systematically detecting potential impacts on an overall profit when the query execution order and execution time are changed in the schedule.

4. The method of claim 3, comprising scheduling the queries in order to maximize the overall profit obtained from all the queries in the query queue.

5. The method of claim 3, comprising monitoring and tuning the cloud computers through resource allocation and de-allocation to maximize the overall profit gain.

6. The method of claim 3, comprising determining profit-oriented decisions on dispatching and capacity planning.

7. The method of claim 1, automatically converting the scheduling policy to be profit-aware if the original scheduling policy is profit-unaware; and if the original scheduling policy is profit-aware, determining a better solution in terms of profit.

8. The method of claim 1, comprising receiving as input a baseline schedule for one or more queries in the queue with arrival time, execution time, and associated SLAs.

9. The method of claim 8, comprising ordering the queries according to the baseline schedule to compute the slack and tardiness based on the baseline schedule.

10. The method of claim 8, comprising determining a potential profit change if for each query, instead of its original execution order and execution time, the query is moved to a first position of the queue, and if an execution time is changed.

11. The method of claim 10, comprising updating a scheduling policy to optimize the profit-oriented schedule.

12. The method of claim 10, comprising monitoring the cloud computers and estimating profit gain or loss when downgrading or upgrading one of the cloud computers.

13. The method of claim 10, comprising performing profit-oriented dispatching and capacity planning decisions.

14. The method of claim 1, comprising construct the SLA-tree through a bottom-up merge process.

15. A cloud computing system, comprising:
   computer-readable code stored on non-transitory computer-readable medium to generate a SLA tree data structure by:
   a. receiving as input slack, tardiness, position in the original baseline schedule, and associated SLA for each query in a queue;
   b. decomposing each multi-level SLA into a sum of single-step SLAs if the SLAs are multi-level;
   c. constructing one or more leaf nodes of a slack tree and a tardiness tree from the queries;
   d. performing an upward pair-wise merge of each pair of lower level nodes into a parent node; and e. repeating the pair-wise merge until a single root node is reached for the slack tree and a root node is reached for the tardiness tree; and
   e. repeating the pair-wise merge until a single root node is reached for the slack tree and a root node is reached for the tardiness tree;
   a data storage device including a service level agreement (SLA)-tree data structure to store each query, slack, tardiness, position in the original baseline schedule, and associated SLA in a query queue; and
   a processor coupled to the data storage device, the processor applying the SLA-tree data structure to determine an overall profit in the query queue and generating a profit-oriented schedule to select the next query for execution by the cloud computers.

16. The system of claim 15, comprising computer readable code stored on non-transitory computer-readable medium to apply the profit-oriented schedule to a profit-oriented task selected from the group consisting of profiling the cloud computing system, profit-oriented dispatching, and profit-oriented capacity planning.

17. A method for scheduling one or more queries for execution with one or more cloud computers, comprising:
   generating an SLA-tree data structure by:
   a. receiving as input slack, tardiness, position in the original baseline schedule, and associated SLA for each query in the queue;
   b. decomposing each multi-level SLA into a sum of single-step SLAs if the SLAs are multi-level;
   c. from the queries, constructing one or more leaf nodes of a slack tree and a tardiness tree;
   d. performing an upward pair-wise merge of each pair of lower level nodes into a parent node; and
   e. repeating the pair-wise merge until a single root node is reached for the slack tree and a root node is reached for the tardiness tree;
   using the SLA-tree data structure to determine an overall profit in the query queue; and
   generating a profit-oriented schedule to select the next query for execution by the cloud computers.

18. The method of claim 17, comprising determining a potential profit change if for each query, instead of its original execution order and execution time, the query is moved to a first position of the queue, and if an execution time is changed.

19. The method of claim 18, comprising updating a scheduling policy to optimize the profit-oriented schedule.

20. The method of claim 18, comprising monitoring the cloud computers and estimating profit gain or loss when downgrading or upgrading one of the cloud computers.

21. The method of claim 18, comprising performing profit-oriented dispatching and capacity planning decisions.

* * * * *